3,160,665
HYDROXY-BENZOPHENONES

Adolf Emil Siegrist, Basel, Erwin Maeder, Munchenstein, and Max Duennenberger, Birsfelden, Switzerland, assignors to Ciba Limited, Basel, Switzerland, a Swiss firm
No Drawing. Filed Feb. 28, 1958, Ser. No. 718,144
Claims priority, application Switzerland, Mar. 6, 1957, 43,521; Jan. 30, 1958, 55,270
4 Claims. (Cl. 260—591)

The present invention provides new hydroxyketones which, as, for example, the ketone of the formula (1) 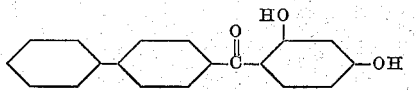

corresponds to the general formula (2) 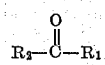

in which $R_1$ represents a radical of the benzene series containing a hydroxyl group in ortho-position to the —CO— group, and $R_2$ represents the radical of a 1:1′-diphenyl bound in the 4-position to the —CO— group.

These new compounds can be made by methods in themselves known, for example, by reacting a compound of the benzene series containing at least one hydroxyl group, which may be etherified, with a 1:1′-diphenyl-4-monocarboxylic acid halide in the presence of a Friedel-Crafts catalyst, or with a 1:1′-diphenyl-4-monocarboxylic acid in the presence of a boron-fluorine compound; or by esterifying a hydroxy-compound of the benzene series with a 1:1′-diphenyl-4-monocarboxylic acid halide, and subjecting the ester so obtained to rearrangement to form the corresponding hydroxy-ketone by treatment with a Friedel-Crafts catalyst, preferably with aluminum chloride.

The 1:1′-diphenyl-4-monocarboxylic acids and their halides, preferably their acid chlorides, used as starting materials may be free from or contain further substituents, for example, in the benzene nucleus linked to the carboxyl group or in the other benzene nucleus or in both nuclei. Examples of further substituents are free or etherified hydroxyl groups, and among the latter more especially alkoxy groups containing up to 3 carbon atoms, such as ethoxy or methoxy groups, hydroxy-alkoxy groups such as hydroxy-ethoxy groups, alkyl groups containing up to 3 carbon atoms such as propyl, ethyl or methyl groups. As examples of diphenyl-carboxylic acids there may be mentioned 1:1′-diphenyl-4-carboxylic acid and 3-hydroxy-1:1′-diphenyl-4-carboxylic acid, and the corresponding carboxylic acid chlorides obtainable from the acids in the usual manner.

The compounds of the benzene series also used as starting materials in the present process contain at least one free or etherified hydroxyl group. There may be used, for example, bicyclic compounds such as diphenyl compounds containing hydroxyl groups, or hydroxy-benzenes having a fused-on saturated hydrocarbon ring, for example, the compound of the formula

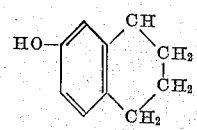

or more especially monocyclic compounds. The compounds may contain more than one hydroxyl group, for example, two or more hydroxyl groups, and in this case all of them may be free (—OH) or all of them may be etherified, or some may be free and the others etherified. These etherified hydroxyl groups are advantageously also alkoxy groups or hydroxy-alkoxy groups containing up to 3 carbon atoms. In addition to one or several substituents of this kind, these compounds may contain further substituents, more especially alkyl radicals containing up to 3 carbons atoms such as ethyl or methyl groups. Good results are obtained, for example, with the compounds of the formula (3) 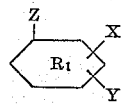

in which X represents a hydrogen atom or an alkyl or aryl group, preferably a benzene radical, or an etherified hydroxyl group, Y represents a hydrogen atom or a hydroxyl group which may be etherified, and Z represents a hydroxyl group which may be etherified. Good results are also obtained with compounds of Formula 3 that contain at least two hydroxyl groups, any desired number of which may be etherified.

Examples of suitable compounds are:

1-hydroxy-4-chlorobenzene,
1-hydroxy-3- or -4-methylbenzene,
1:3-dihydroxybenzene,
1-hydroxy-3-methoxybenzene,
1-hydroxy-3-ethoxybenzene,
1:3-dimethoxy- or -diethoxybenzene,
1:3-dimethoxy-4-methylbenzene,
1-hydroxy-2:4-dimethylbenzene.

The compounds of the benzene series may be reacted with the diphenyl-monocarboxylic acid halides in the presence of Friedel-Crafts catalysts in general, such as boron-fluoride compounds, stannic chloride, ferric chloride or preferably aluminum chloride, while for the reaction with the free diphenyl-carboxylic acids boron-fluorine compounds, preferably boron trifluoride, are used. In all other respects these reactions can be carried out in a known manner, advantageously in an organic solvent that is inert to the starting materials and to the catalyst. The separation and working up of the ketones obtained by the process of this invention are likewise carried out by methods in themselves known. By recrystallization from a suitable solvent the ketones can be obtained in a very pure form.

When a compound containing exclusively etherified hydroxyl groups is used for the reaction with the diphenyl-carboxylic acid or halide thereof, the reaction, especially when performed at an elevated temperature, is accompanied by the splitting up of the etherified hydroxyl group (Z) in ortho-position to the —CO— bridge formed and, depending on the reaction conditions, also by the splitting up of other etherified hydroxyl groups, so that these starting materials also yield oxy-ketones of Formula 2.

The esterification of the hydroxy-compounds of the benzene series with 1:1′-diphenyl-4-carboxylic acid halides can likewise be carried out in a known manner, for example, in an aqueous medium or in an inert organic solvent, such as benzene, and in the presence of a hydrogen halide acceptor, such as an alkali hydroxide or pyridine. The rearrangement of the esters to form the hydroxy-ketones can likewise be carried out with a Friedel-Crafts catalyst in known manner.

If desired, further substituents may be introduced into the hydroxy-ketones of Formula 2 in known manner. Thus, for example, these ketones may be treated with a sulfonating agent, such as sulfuric acid containing free sulfur trioxide (oleum), whereby a sulfonic acid is obtained, which latter can then be converted in the usual manner into its halide and the latter, with the aid of ammonia or a primary or secondary amine, into the sulfonic acid amide.

Another method of introducing a further substituent is to treat the hydroxy-ketone with an aldehyde or an agent yielding an aldehyde, and a secondary amine, such as dimethylamine, diethylamine, piperidine or morpholine, or with a corresponding addition compound. In this manner by using an agent yielding formaldehyde, such as trioxymethylene, and a secondary amine, tertiary aminomethyl groups can be introduced, for example, the group

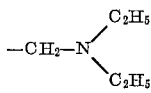

Finally, the hydroxy-ketones may be nitrated, the nitro group reduced to the amino groups, and the amino group alkylated or acylated.

The introduction of the aforesaid substituents proceeds especially advantageously, that is to say in a substantially unitary manner, in the case of hydroxy-ketones which contain substituents that strongly favor reaction in certain positions, as in the case, for example, of 2:4-dihydroxy-4'-phenyl-benzophenone into which the new substituent enters only the 5-position.

The new hydroxy-ketones are suitable for a very wide variety of purposes, for example, as intermediates in the manufacture of dyestuffs.

The new hydroxy-ketones are, however, especially valuable as light-screening agents for a wide variety of materials. As compared with known compounds of similar constitution, they are usually superior because they are capable of absorbing ultra-violet radiation over a wider range of wavelengths within the range of about 250 m$\mu$ and 400 m$\mu$, which is known to be especially harmful, and they have very substantial extinction properties for such rays. In addition, the compounds themselves are very fast to light and cause no substantial absorption above 400 m$\mu$.

These two properties are a very important prerequisite for the practical use of these compounds as light-screening agents against the highly active ultra-violet rays.

There are three principal ways of using the new compounds, which may be used singly or in combinations with one another:

(A) The light-screening agent is incorporated with a substratum for the purpose of protecting it from the action of ultra-violet rays, and so preventing one or more of its physical properties being impaired, for example, to prevent discoloration, lowering of the tensile strength, embrittlement or the like, and/or preventing chemical reactions activated by ultraviolet rays, such as oxidation processes. The incorporation of the light-screening agent may be carried out before or during the manufacture of the substratum or, after its manufacture, by a suitable process, for example, a fixing process, resembling a dyeing process.

(B) The light-screening agent is incorporated with a substratum for the purpose of protecting one or more other substances, for example, dyestuffs, assistants or the like, contained in the substratum, and this may be achieved simultaneously with protection of the substratum as mentioned under (A) above.

(C) The light-screening agent is incorporated in a "filter layer" for the purpose of protecting a substance placed immediately underneath it or at some distance from it (for example, in a shop window) from the action of the ultraviolet rays. The filter layer so used may be solid (a film, foil, top dressing) or semi-solid (a cream, oil, wax).

As materials that can be protected there may be mentioned:

(a) Textile materials in general, and in any desired form, for example in the form of fibers, threads, yarns, woven or knitted fabrics or felt, as well as finished products made therefrom. Such textile materials, may consist of: natural materials of animal origin such as wool or silk, or of vegetable origin such as cellulose materials of cotton, hemp, flax, linen, jute or ramie, or of semi-synthetic materials such as regenerated cellulose, for example rayon, viscoses including spun rayon, or synthetic materials produced by polymerization or copolymerization, for example polyacrylonitrile, or by polycondensation such as polyesters and above all polyamides. In the case of semi-synthetic materials it is advantageous to add the light-screening agent to the spinning mass, for example a viscose spinning mass or acetyl-cellulose (including cellulose triacetate) spinning mass, and, in the case of compositions yielding fully synethetic fibers (such as polyamide melts or polyacrylonitrile spinning masses), to add the light screening agent prior to, during or after the polycondensation or polymerization, respectively.

(b) Fibrous material of other kinds, not being textile materials, which may be of animal origin, such as feathers, hairs, pelts or hides and leather made therefrom by natural or chemical tanning, as well as goods made therefrom; furthermore materials of vegetable origin such as straw, wood, woodpulp or fibrous materials made of compacted fibers such as paper, cardboard or compressed wood, as well as materials made therefrom. Furthermore paper pulp used in the manufacture of paper (for example hollander pulp).

(c) Coatings and dressings for textiles and paper, for example, those made with starch or casein, or those containing a synthetic resin, such as vinyl acetate or a derivative of acrylic acid.

(d) Varnishes and films having various compositions, for example, those made from acetyl-cellulose, cellulose propionate, cellulose butyrate or cellulose mixtures such, for example, as cellulose acetate butyrate and cellulose acetate propionate; furthermore nitrocellulose, vinyl acetate, polyvinyl chloride, copolymers of vinyl chloride and vinylidene chloride, alkyd lacquers, polyethylene, polyamides, polyacrylonitrile, polyesters and the like. Of special importance is the incorporation of the new hydroxyketones with wrapping materials, more especially the known transparent foils of regenerated cellulose (viscose) or acetyl cellulose. In such applications it is as a rule of advantage to incorporate the light-screening agent with the material from which such foils are made.

(e) Natural and synthetic resins, for example epoxy resins, polyester resins, vinyl resins, polystyrene resins, alkyd resins, aldehyde resins such as condensation products of formaldehyde with phenol, urea or melamine, as well as emulsions made with synthetic resins (for example oil-in-water or water-in-oil emulsions). In such applications it is of advantage to incorporate the light-screening agent prior to, or in the course of the polymerization or polycondensation respectively. Synthetic resins reinforced with glass fibers, and laminates made therefrom, may likewise be mentioned.

(f) Hydrophobic materials containing oils, fats or waxes such as edible oils and fats, butter, candles, floor polishes, floor stains or other wood stains, furniture polishes, more especially those for use on light-colored, if desired, bleached wood surfaces.

(g) Natural rubber-like materials such as rubber, balata, gutta-percha or synthetic vulcanizable substance such as polychloroprene, olefinic polysulfides, polybutadiene or copolymers of butadiene-styrene or butadiene-acrylonitrile which substances may further contain fillers, pigments, vulcanization accelerators and the like, and in which application the addition of the hydroxyketones of the invention slows down the ageing and thereby prevents embrittlement and deterioration of the plasticity.

(h) Cosmetic preparations such as perfumes, colored or uncolored soaps and bath salts, hair-sprays, skin and face creams, powders, insect repellants and more especially anti-sunburn oils and creams. The use of the new hydroxyketones in such preparations is indicated when it is intended to prevent the harmful reddening of the skin.

caused by rays of a wavelength of 270 to 320 mμ and at the same time to reduce the tanning of the skin due to ultra-violet rays of a superior wavelength (up to about 400 mμ).

(*i*) For making filter layers for photographic purposes, more especially for the manufacture of color-photographic materials.

It will be readily understood that the new hydroxy-ketones are suitable as light-screening agents not only for undyed but also for dyed or pigmented materials. When so used, they additionally protect the dyestuff whereby in some cases a considerably enhanced fastness to light is achieved. If desired, the treatment with the light-screening agent may be combined with the dyeing or pigmenting process.

According to the type of material treated, to the requirements of effectiveness and durability and other contingencies the amount of light-screening agent to be incorporated with the material concerned may vary within rather wide limits, for examfple from about 0.01 to 10% and preferably 0.1 to 2% of the weight of the material which is to be directly protected from ultra-violet rays.

Unless otherwise indicated, parts and percentages in the following example, which illustrate the invention, are by weight. The melting points are uncorrected.

Example 1

222 parts of 1:3-dihydroxybenzene and 396 parts of 1:1'-diphenyl-4-carboxylic acid are pasted in 800 parts by volume of tetrachloroethane. In the course of 2 to 3 hours 180 parts of boron trifluoride are introduced with stirring, the temperature being maintained below 45° C. by transient cooling. The reaction mixture is then stirred for a further 5 hours on a boiling waterbath, cooled to room temperature and poured into 5000 parts of water containing 550 parts of crystalline sodium acetate.

After prolonged stirring the mixture is kept overnight, suction filtered, and the filter residue is washed with cold water and recrystallized from 1700 parts by volume of methanol with the addition of active carbon, and then dried. Yield: about 394 parts (corresponding to 67.6% of the theoretical yield) of 2:4-dihydroxy-4'-phenyl-benzophenone of the formula (4)
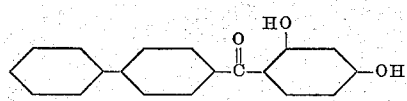

in the form of a yellow crystalline powder melting at 182–183° C. After having been recrystallized twice from ethanol it melts at 183–184° C.

*Analysis.*—$C_{19}H_{14}O_3$. Calculated: C, 78.60%; H, 4.85%. Found: C, 78.60%; H, 4.83%.

In an ethanolic solution the substance displays an absorption maximum at 293 mμ ($\epsilon$=21,900).

By using instead of 222 parts of 1:3-dihydroxybenzene an equimolecular quantity of 2-hydroxy-5:6:7:8-tetrahydronaphthalene, the product of the formula (5)
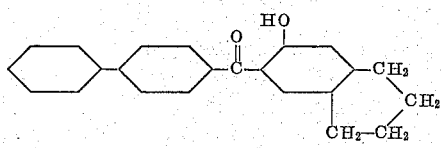

is obtained in the form of pale-yellow needles melting at 147–148° C. after recrystallization from ethanol.

*Analysis.*—$C_{23}H_{20}O_2$. Calculated: C, 84.12%; H, 6.14%. Found: C, 83.98%; H, 6.22%.

Ultra-violet absorption spectrum in ethanol:
$\lambda_{max}$=290 mμ, $\epsilon_{max}$=32,200.
$\lambda_{max}$=343 mμ, $\epsilon_{max}$=13,900.

Example 2

495 parts of 1:1'-diphenyl-4-carboxylic acid are heated under reflux with 2500 parts of thionyl chloride until no more hydrogen chloride is evolved. The excess of thionyl chloride is evaporated in vacuo, and 275 parts of 1:3-dihydroxybenzene and 1500 parts by volume of nitrobenzene are added. 360 parts of anhydrous aluminum chloride are then added while stirring and cooling between 25 and 30° C. In the course of one hour the reaction mixture is raised to 55 to 60° C., stirred at that temperature for 4 hours, and then allowed to cool. Decomposition of the reaction mixture is accomplished by stirring it into 1000 parts of water, 2000 parts of ice and 250 parts by volume of concentrated hydrochloric acid, during which operation the temperature does not rise above 10 to 15° C. Addition of a few drops of a wetting agent accelerates the decomposition and settling of the organic phase. The aqueous phase is decanted and the nitrobenzene layer is washed with water until neutral and then subjected to steam distillation. The yellow granular residue is suctioned off, and the filter residue is thoroughly washed with cold water and dried.

There are obtained about 664 parts (91.5%) of a yellow crystalline powder of Formula 4, melting at 175–180° C. After having been crystallized once from ethanol it melts at 180.5 to 182° C.

A mixed melting point test performed with the product obtained in Example 1, melting at 183–184° C., produced no depression of the melting point.

When the reaction is performed at 70° C. with 2-hydroxy-5:6:7:8-tetrahydronaphthalene, instead of with 1:3-dihydroxybenzene, a product of Formula 5 is obtained which melts at 148–149° C. A mixed melting point test of this product with the product of Example 1, having the same melting point, proved that the two products are identical.

Example 3

The 1:1'-diphenyl-4-carboxylic acid chloride is prepared in the usual manner from 991 parts of 1:1'-diphenyl-4-carboxylic acid and 5000 parts of thionyl chloride. 691 parts of 1:3-dimethoxybenzene and 2800 parts by volume of nitrobenzene are added, and 716 parts of anhydrous aluminum chloride are added between 25 and 30° C. in portions with stirring and cooling. In the course of 2 hours the reaction temperature is raised to 80° C., and the mixture is stirred at this temperature for 4 hours and then allowed to cool. The viscous mass is then stirred into a mixture of 3000 parts of water, 7000 parts of ice and 350 parts by volume of concentrated hydrochloric acid. When the organic phase has settled, the aqueous phase is decanted, and the organic phase is washed until neutral and subjected to steam distillation; the distillate is allowed to cool and the resulting brown resin is recrystallized from ethanol with the addition of active carbon to yield about 860 parts (56.5%) of paleyellow flakes of the formula (6)
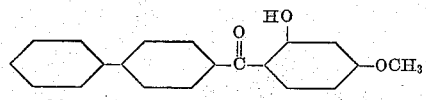

melting at 99 to 100.5° C. The pure product obtained after repeated recrystallization from chloroform+methanol melts at 105–106° C.

*Analysis.*—$C_{20}H_{16}O_3$. Calculated: C, 78.93%; H, 5.30%. Found: C, 78.90%; H, 5.41%.

Ultra-violet absorption spectrum in ethanol:
$\lambda_{max}$=292 mμ, $\epsilon_{max}$=23,300.
$\lambda_{max}$=325 mμ, $\epsilon_{max}$=16,500.

When the reaction is performed under identical conditions with 1:3-diethoxybenzene instead of with 1:3-dimethoxybenzene, a product of the formula (7)
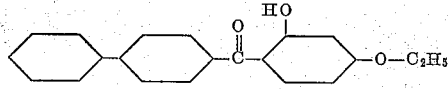

results. The pure product, obtained by repeated recrystallization from chloroform+methanol, melts at 114 to 115° C.

*Analysis.*—C₂₁H₁₈O₃. Calculated: C, 79.27%; H, 5.70%. Found: C, 79.29%; H, 5.77%.

Ultra-violet absorption spectrum in ethanol:
$\lambda_{max}=292$ m$\mu$, $\epsilon_{max}=23,600$.
$\lambda_{max}=325$ m$\mu$, $\epsilon_{max}=17,200$.

Example 4

180 parts of aluminum chloride are heated to 100° C. with stirring in 1000 parts by volume of trichlorobenzene, and at that temperature 135 parts of 1-hydroxy-4-methylbenzene and 271 parts of 1:1'-diphenyl-4-carboxylic acid chloride are added. In the course of 30 minutes the temperature is raised to 190 to 200° C., and the mixture is stirred at that temperature for 2 hours and then allowed to cool. The reaction product is then entered into 3000 parts of ice and 200 parts by volume of concentrated hydrochloric acid and stirred until the organic phase has settled. The aqueous phase is decanted and the organic phase washed with water until neutral and then subjected to steam distillation. The brown resin thus obtained is taken up in 300 parts by volume of boiling chloroform and filtered with the aid of active carbon. Concentration of the filtrate and treatment with hot methanol until turbidity sets in yields about 232 parts (64%) of a yellow crystalline precipitate melting at 78–79° C. The pure product of the formula (8) 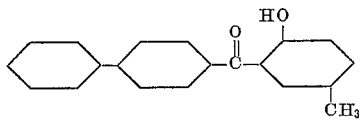

obtained by recrystallization from acetone+petroleum ether, is in the form of yellow prisms melting at 79 to 80° C.

*Analysis.*—C₂₀H₁₆O₂. Calculated: C, 83.31%; H, 5.59%. Found: C, 83.36%; H, 5.67%.

Ultra-violet absorption spectrum in ethanol:
$\lambda_{max}=291$ m$\mu$, $\epsilon_{max}=18,700$.
$\lambda_{max}=345$ m$\mu$, $\epsilon_{max}=6,500$.

When the reaction is performed under identical conditions with 1-hydroxy-4-chlorobenzene instead of with 1-hydroxy-4-methylbenzene, a yellow product of the formula (9) 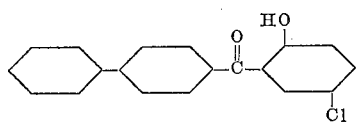

results which, after recrystallization from chloroform and petroleum ether, is obtained in pure form melting at 104.5–105.5° C.

*Analysis.*—C₁₉H₁₃O₂Cl. Calculated: C, 73.99%; H, 4.23%. Found: C, 73.80%; H, 4.38%.

Ultra-violet absorption spectrum in chloroform:
$\lambda_{max}=300$ m$\mu$, $\epsilon_{max}=10,600$.
$\lambda_{max}=345$ m$\mu$, $\epsilon_{max}=5,400$.

When 1-hydroxy-4-phenylbenzene is used as reaction component, a product of the formula

(10) 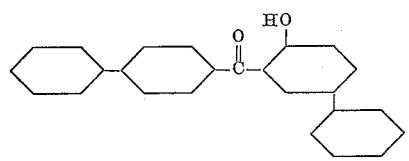

is obtained which melts at 135.5–136° C.

*Analysis.*—C₂₅H₁₈O₂. Calculated: C, 85.69%; H, 5.18%. Found: C, 85.29%; H, 5.17%.

Ultra-violet absorption spectrum in ethanol:
$\lambda_{max}=250$ m$\mu$, $\epsilon_{max}=33,200$.
$\lambda_{max}=286$ m$\mu$, $\epsilon_{max}=20,600$.
$\lambda_{max}=359$ m$\mu$, $\epsilon_{max}=4,500$.

Example 5

250 parts of para-cresyl-diphenyl-4-carboxylic acid ester of the formula

(11) 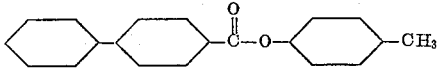

are mixed with 2000 parts by volume of trichlorobenzene and heated to 140° C., and at this temperature 200 parts of anhydrous aluminum chloride are stirred in portionwise. After ½ hour the reaction temperature is raised within 30 minutes to 200° C., the mixture is stirred for 3 hours at that temperature and then allowed to cool. The reaction mixture is then stirred ino 500 parts of ice and 200 parts by volume of concentrated hydrochloric acid. When the organic phase has settled, the aqueous phase is decanted, the organic layer washed until neutral and subjected to steam distillation. The resinous residue is taken up in 3000 parts by volume of chloroform, active carbon is added, and the mixture is heated to the boil and then filtered. The filtrate is concentrated, treated with methanol until turbidity sets in, and a yellow crystalline precipitate (about 205 parts, corresponding to 82%) melting at 75 to 77° C. is obtained. The identity of the product of Formula 8 with the product obtained according to Example 4, melting at the same temperature, can be proved by a mixed melting point test.

Para-cresyl-diphenyl-4-carboxylic acid ester, melting at 125–126° C., used as starting product, is obtained in 90% yield from 1:1'-diphenyl-4-carboxylic acid chloride and 1-hydroxy-4-methylbenzene in pyridine. Recrystallization from chloroform and ethanol yields the pure product in the form of small white needles melting at 127 to 128° C.

*Analysis.*—C₂₀H₁₆O₂. Calculated: C, 83.31%; H, 5.59%. Found: C, 83.4%; H, 5.43%.

Ultra-violet absorption spectrum in ethanol:
$\lambda_{max}=278$m$\mu$, $\epsilon_{max}=28,400$.

Example 6

29 parts of 2:4-dihydroxy4'-phenyl-benzophenone, 10 parts of trihydroxymethylene and 20 parts of dimethylamine hydrochloride in 200 parts by volume of ethanol are stirred under reflux for 5 hours with the reaction mixture gradually passing into solution. The whole is then cooled to 10° C., stirred for some time longer at that temperature, and the precipitated crystalline reaction product is filtered off, washed with ethanol and dried, to yield 26 parts of 2:4-dihydroxy-5-N:N'-dimethylaminomethyl-4'-phenyl-benzophenone in the form of the hydrochloride of the formula

(12) 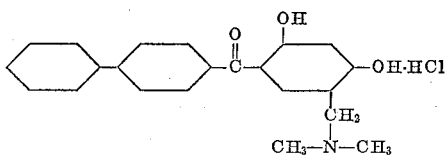

as an almost colorless powder melting at 195–197° C. After having been recrystallized twice from ethanol, the substance forms fine, colorless flakes melting at 198–199.5° C.

*Analysis.*—C₂₂H₂₂O₃NCl. Calculated: C, 68.83%; H, 5.78%; N, 3.65%; Cl, 9.23%. Found: C, 68.93%; H, 5.59%; N, 3.80%; Cl, 9.34%.

Dissolved in ethanol the substance has two absorption maxima, namely at 293 m$\mu$ ($\epsilon=20,550$) and at 330 m$\mu$ ($\epsilon=19,100$).

When the 20 parts of dimethylamine hydrochloride are replaced by an equimolecular amount of morpholine hydrochloride, a product is obtained that has similar properties.

Example 7

58 parts of 2:4-dihydroxy-4'-phenyl-benzophenone are stirred at 15 to 20° C. into 200 parts of oleum (containing 20% of SO₃) and stirred for a further 45 minutes at that temperature. The sulfonation mixture is then poured into 2000 parts of ice water, heated to about 40° C., and 5 parts of a surface-active absorption agent and 5 parts of kieselguhr are added. The whole is filtered and the filtrate salted out with 500 parts of sodium chloride. The precipitated sodium salt of 2:4-dihydroxy-4'-phenyl-benzophenone-5-sulfonic acid of the formula (13)

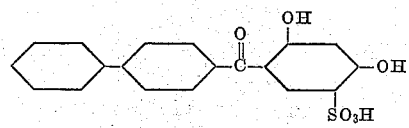

is filtered off and dried; it forms a pale-yellow water-soluble powder.

*Example 8*

An acetonic solution of 10% strength of acetyl cellulose, containing 1% of 2:4-dihydroxy-4'-phenyl-benzophenone (obtained according to Example 1) calculated on the weight of the acetyl cellulose, is used to produce a foil approximately 40μ thick, which is then dried. A portion of this foil is exposed under a fadeometer for 4 hours. The percent permeability to light measured in this manner amounts to:

| Wavelength in mμ | Permeability to light in percent after $n$ hours' exposure | | | |
|---|---|---|---|---|
| | $n=0$ | $n=100$ | $n=500$ | $n=1,000$ |
| 270 to 340 | 0 | 0 | 0 | 0 |
| 350 | 2½ | 2½ | 1½ | ½ |
| 360 | 9 | 10 | 9½ | 3½ |
| 370 | 32 | 34 | 30½ | 18½ |
| 380 | 60 | 61 | 56 | 39½ |
| 390 | 78 | 77 | 72 | 57½ |

*Example 9*

In a hollander a paper pulp is prepared comprising 150 parts of bleached sulfite or sulfate cellulose
60 parts of zinc sulfide
6 parts of aluminum sulfate
3 parts of finely dispersed aqueous paste containing 25% of the azo pigment of the formula

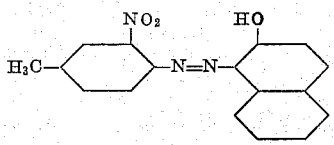

and about 5000 parts of water.

The paper made from this pulp is immersed in a bath containing 100 parts of a pulverulent, hardenable, water-soluble condensation product from 1 mol of melamine and about 2 mols of formaldehyde, and
100 parts by volume of a mixture obtained from a solution of 1 part of the light-screening agent of Formula 12 prepared as described in Example 6 and 19 parts by volume of ethanol, by dilution with water to make 100 parts by volume The excess of resin solution is removed and the paper is dried.

The paper produced in this manner is pressed on a support consisting of tissue paper impregnated with the melamine resin specified above, a layer of phenol paper and an interlayer of filter paper impregnated with the melamine resin specified above, for 10 minutes at 140 to 150° C. under a pressure of 75 kg. per sq. cm.

The laminate obtained in this manner is exposed under a fadometer and then displays a fastness to light better by about 4 grades than paper not containing the light-screening agent of Formula 12 prepared as described in Example 6.

When the light-screening agent used in the above example is added only to that bath of melamine resin which is used for impregnating the tissue paper, a similar increase in fastness to light is attained.

When the light-screening agent of Formula 12 according to Example 6 is replaced by an equal amount of 2:4-dihydroxybenzophenone, the fastness to light obtained is only by about ½ grade better than when no light-screening agent is added.

*Example 10*

In a hollander a paper pulp is prepared from:

150 parts of bleached sulfite cellulose
7½ parts of china clay,
6 parts of aluminum sulfate,
3 parts of the sulfonation product of the dyestuff of the formula

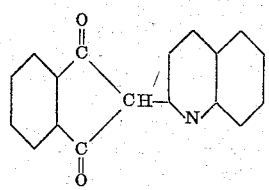

and about 5000 parts of water.

Paper made from this pulp is coated at room temperature with a coating composition comprising 900 parts of a mixture of 28% of polyvinyl acetate, 2% of an anhydrous emulsifier and 70% of water, and
10 parts of the light-screening agent of Formula 13, prepared according to Example 7, dissolved in
90 parts of water, and then dried at 50 to 60° C.

After exposure under a fadometer the paper obtained in this manner displays a fastness to light better by about 1½ grades than paper made without the addition of the light-screening agent.

*Example 11*

50 parts of an alkyd-melamine stoving varnish, comprising 47.5 parts of a non-drying alkyd resin modified with coconut fatty acid,
31.6 parts of toluene,
12.5 parts of a concentrated butanolic solution of a melamine-formaldehyde condensation product partially etherified with butanol, are stirred at room temperature for 10 minutes with a solution 0.15 part of copper phthalocyanine-tetramethoxypropyl sulfonamide and
0.3 part of the light-screening agent of Formula 6 prepared according to Example 3 in
10 parts of acetone.

Tinfoil is coated with this mixture on a film coating apparatus to produce on it a wet film of 0.2 mm. thickness, and the coated foil is then stoved for 1 hour at 120° C. The film so produced is allowed to cool and then covered with another film of like thickness, having the same composition as the first film except that it does not contain the specified dyestuff. After stoving, the resulting blue two-ply varnish film is exposed under a fadometer and displays a fastness to light better by about 2½ grades than that of a film that does not contain the light-screening agent of Formula 6 prepared as described in Example 3. When the light-screening agent is incorporated with only one of the two varnish layers the fastness to light is improved by about 2 grades.

*Example 12*

50 parts of a vinyl resin lacquer comprising 240.4 parts of a stabilized polyvinyl chloride (for example 228 parts of "Vinylite VMCH" [product of Union Carbide and Carbon Corporation] stabilized with 12.4 parts of "Stabilisator No. 52 [of Advance Solvents]) and
24.6 parts of dioctyl phthalate,
367.5 parts of methyl-ethyl ketone and
267.5 parts of toluene are stirred at room temperature for 10 minutes with a solution of 0.133 part of copper phthalocyanine-tetramethoxy-propylsulfonamide,
0.133 part of the light-screening agent of Formula 4 prepared as described in Example 1 or 2 in
11.5 parts of acetone.

Tinfoil is coated with the mixture on a film coating apparatus to produce on it a wet film of 0.2 mm. thickness, and the coated foil is then dried for 5 minutes at 120° C. The film treated in this manner is allowed to cool and then covered with another film of equal thickness having the same composition as the first film except that it does not contain the dyestuff mentioned above. The whole is then dried again for 5 minutes at 120° C. The resulting blue two-ply lacquer film is exposed under a fadeometer and displays a fastness to light better by about 1½ grades than a film not containing the light-screening agent of Formula 4.

*Example 13*

0.01 part of a paste consisting of 50 parts of the azo pigment of the formula

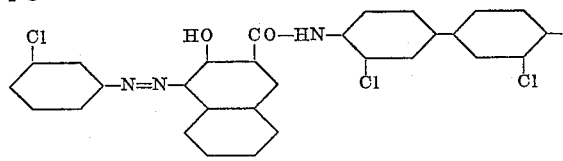

and 50 parts of dioctyl phthalate, mixed on a three-roller mixer,
0.1 part of the light-screening agent of Formula 7 prepared as described in Example 3,
13.0 parts of a stabilized polyvinyl chloride and 7.0 parts of dioctylphthalate are intimately mixed and gelated on a calender for 5 minutes at 145 to 150° C. The foil obtained in this manner is exposed under a fadeometer and displays a fastness to light better by at least 1 grade than that of a foil not containing the light-screening agent of Formula 7 according to Example 3.

*Example 14*

5 parts of 2:4-dihydroxy-4'-phenyl-benzophenone (Formula 4), 10 parts of adipic acid isopropyl tetrahydrofurfuryl ester and 1 part of glycerol monostearate are dissolved in 84 parts of ethanol to yield a lotion which protects the skin from sunburn and repels insects and is excellently suitable for application to uncovered parts of the human body.

*Example 15*

4 parts of the condensation product (Formula 4) described in Example 1 are dissolved in 96 parts of ethanol, and 0.5 part of perfume oil are added. 40 parts of the resulting solution are charged into an aerosol container together with 60 parts of a mixture of equal parts of trichloro-monofluoro methane and dichloro-difluoro methane. In this manner an aerosol spray is obtained which can be used to protect the skin from sunburn.

*Example 16*

10 parts of adipic acid isopropyl tetrahydrofurfuryl ester, 5 parts of benzoic acid diethylamide, 8 parts of phthalic acid dimethyl ester and 5 parts of the condensation product (Formula 4) described in Example 1 are dissolved in 36 parts of groundnut oil and 36 parts of paraffin oil. A sunburn lotion is obtained which also acts as a repellant to insects.

*Example 17*

4 parts of the condensation product (Formula 4) described in Example 1, 10 parts of glycerine monostearate, 4 parts of cetyl alcohol, 1 part of sodium cetyl sulfate, 1 part of stearic acid and 5 parts of glycerol are intimately mixed together and emulsified in 75 parts of water. The resulting emulsion is very suitable as a non-greasy skin cream which protects the treated skin from sunburn.

*Example 18*

5 parts of adipic acid isopropyl tetrahydrofurfuryl ester, 5 parts of toluic acid diethylamide, 3 parts of the condensation product (Formula 4) described in Example 1, 6 parts of cetyl alcohol, 14 parts of white petroleum jelly, 10 parts of white beeswax, 14 parts of lanolin, 3 parts of coconut butter, 39.7 parts of water and 0.3 part of sodium benzoate are intimately mixed together to form an excellent sunburn cream which repels insects.

What is claimed is:
1. A hydroxy ketone of the formula

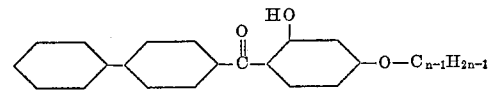

in which $n$ represents a whole number of at the most 3.

2. The hydroxy ketone of the formula

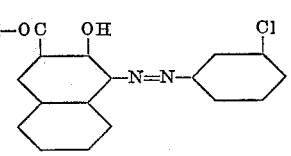

3. The hydroxy ketone of the formula

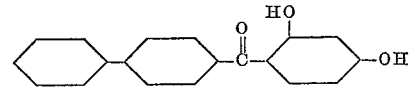

4. The hydroxy ketone of the formula

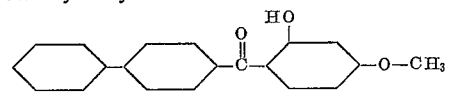

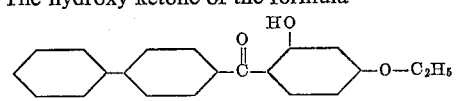

References Cited by the Examiner

UNITED STATES PATENTS

| | | | |
|---|---|---|---|
| 2,231,067 | 2/41 | Hammond et al. | 260—570 |
| 2,554,434 | 5/51 | Watkins | 260—511 |
| 2,614,940 | 10/52 | Freyermuth et al. | 106—125 |
| 2,682,559 | 6/54 | Stanley et al. | 260—591 |
| 2,686,812 | 8/54 | Wynn et al. | 260—591 |
| 2,763,657 | 9/56 | Allen et al. | 260—570 |
| 2,773,903 | 12/56 | Hardy et al. | 260—591 |
| 2,777,828 | 1/57 | Day et al. | 260—45.4 |
| 2,861,053 | 11/58 | Lappin et al. | 260—591 |
| 2,861,105 | 11/58 | Stanley et al. | 260—591 |
| 2,879,297 | 3/59 | Prill et al. | 260—591 |

OTHER REFERENCES

Buu-Hoi et al.: "Rec. Trav. Chim.," vol. 70, pages 825–32 (1951).

LORRAINE A. WEINBERGER,
*Acting Primary Examiner.*
NATHAN MARMELSTEIN, CHARLES B. PARKER, LEON ZITVER, *Examiners.*